United States Patent
Foley

(10) Patent No.: US 12,062,094 B2
(45) Date of Patent: *Aug. 13, 2024

(54) DARKPOOL MATCHING OF ORDERS WITH PRICE DISCRETION

(71) Applicant: CFPH, LLC, New York, NY (US)

(72) Inventor: Kevin Foley, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,726

(22) Filed: Feb. 13, 2023

(65) Prior Publication Data

US 2023/0186393 A1    Jun. 15, 2023

Related U.S. Application Data

(63) Continuation of application No. 17/091,496, filed on Nov. 6, 2020, now Pat. No. 11,580,602, which is a continuation of application No. 14/701,524, filed on Apr. 30, 2015, now Pat. No. 10,832,324.

(60) Provisional application No. 61/986,691, filed on Apr. 30, 2014.

(51) Int. Cl.
G06Q 40/04    (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS 8,635,144 B2 *    1/2014    Waelbroeck ........... G06Q 40/06
                                                                    705/37

* cited by examiner

*Primary Examiner* — Edward Chang

(57) ABSTRACT

Systems and methods for processing a discretion order in a dark pool matching environment may receive a first order of a first trader, and a contra second order defining a quantity reserved in an OMS of a second trader and a price range. When a first price of the first order is determined to be within the price range, (1) the price of the first order and (2) execution indicia selectable by the second trader to cause execution of a portion of the second order against a portion of the first order, are provided to the second trader. The first price of the first order and the execution indicia are not output or otherwise disclosed to the second trader, prior to determining that the first price of the first order is within the price range of the second order.

20 Claims, 3 Drawing Sheets

DARKPOOL MATCHING OF ORDERS WITH PRICE DISCRETION

CROSS REFERENCE TO RELATED APPLICATIONS

This application is a continuation of U.S. patent application Ser. No. 17/091,496 filed Nov. 6, 2020, which is a continuation of U.S. patent application Ser. No. 14/701,524 filed Apr. 30, 2015 (now U.S. Pat. No. 10,832,324 issued Nov. 10, 2020), which claims the benefit of U.S. Provisional Application No. 61/986,691 filed Apr. 30, 2014, the disclosures of which are incorporated by reference herein in their entireties.

FIELD OF THE INVENTION

The present invention generally relates to systems and methods for managing orders to buy or sell trading products, e.g., in an electronic trading environment.

BACKGROUND

Many traders wish to view the buy and sell interests of other traders but prefer not to disclose their own buy and sell interests. In some cases, a trader's mere disclosure of a buy interest in a particular trading product can trigger an increase in the price of the trading product, to the detriment of the trader who disclosed the interest. However, if all traders refused to disclose their interest, then there would be no buy and sell interest for anyone to view. Accordingly, many trading systems incentivize traders to disclose their orders, e.g., by prioritizing disclosed orders and order quantities over un-disclosed orders and order quantities.

BRIEF SUMMARY OF THE INVENTION

Various darkpool matching systems enable traders to trade various trading products without seeing all other trading interests in those products. For example, in some darkpool matching systems, users do not see most orders from other users. Some darkpool matching systems enable traders to see an interest in a trading product (e.g., a buy order) only if they satisfy one or more criteria, e.g., if they have expressed an opposite interest (e.g., a sell order for the same trading product). For example, a buy order in Google stock may be disclosed only to those traders who have recently sold Google stock, or who have an order to sell Google stock open in the system.

Various embodiments of the present invention relate to an electronic trading platform that receives a discretion order from a trader and selectively discloses to the trader appropriate contra orders, e.g., that match a price or other criteria defined by the discretion order. In some embodiments, communications such as order messages, opportunities to trade, and execute or cancel instructions may be made via SMS, email, or other communication medium. In some embodiments, a central server, third party, or firewalled trader module may coordinate communications so that orders, trader identities, and other information may be either selectively disclosed to qualified traders or not disclosed to any trader.

Various embodiments are directed to systems, apparatus, methods, and computer-readable media for processing a discretion order in a dark pool matching environment. A first order to buy or sell a trading product is received from a computer of a first trader. The first order has a first price and a first size. A second order to buy or sell the trading product that is contra to the first order is received from a second trader. The second order defines a second quantity and a price range of possible prices at which the second order can be executed. The price range comprises at least a second price. The second quantity of the trading product is reserved in an OMS of the second trader such that the second quantity of the second order is permitted by the OMS to be executed at any price within the price range. The second order is received before or after the first order is received. A processor determines that the first price of the first order is within the price range of the second order. Responsive to the determination, two items are output to the second trader: (1) the price of the first order and (2) an execution indicia selectable by the second trader to cause at least a portion of the second order to be executed against at least a portion of the first order. The first price of the first order and the execution indicia are not output or otherwise disclosed to the second trader prior to the act of determining that the first price of the first order is within the price range of the second order.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION

Figure 1:
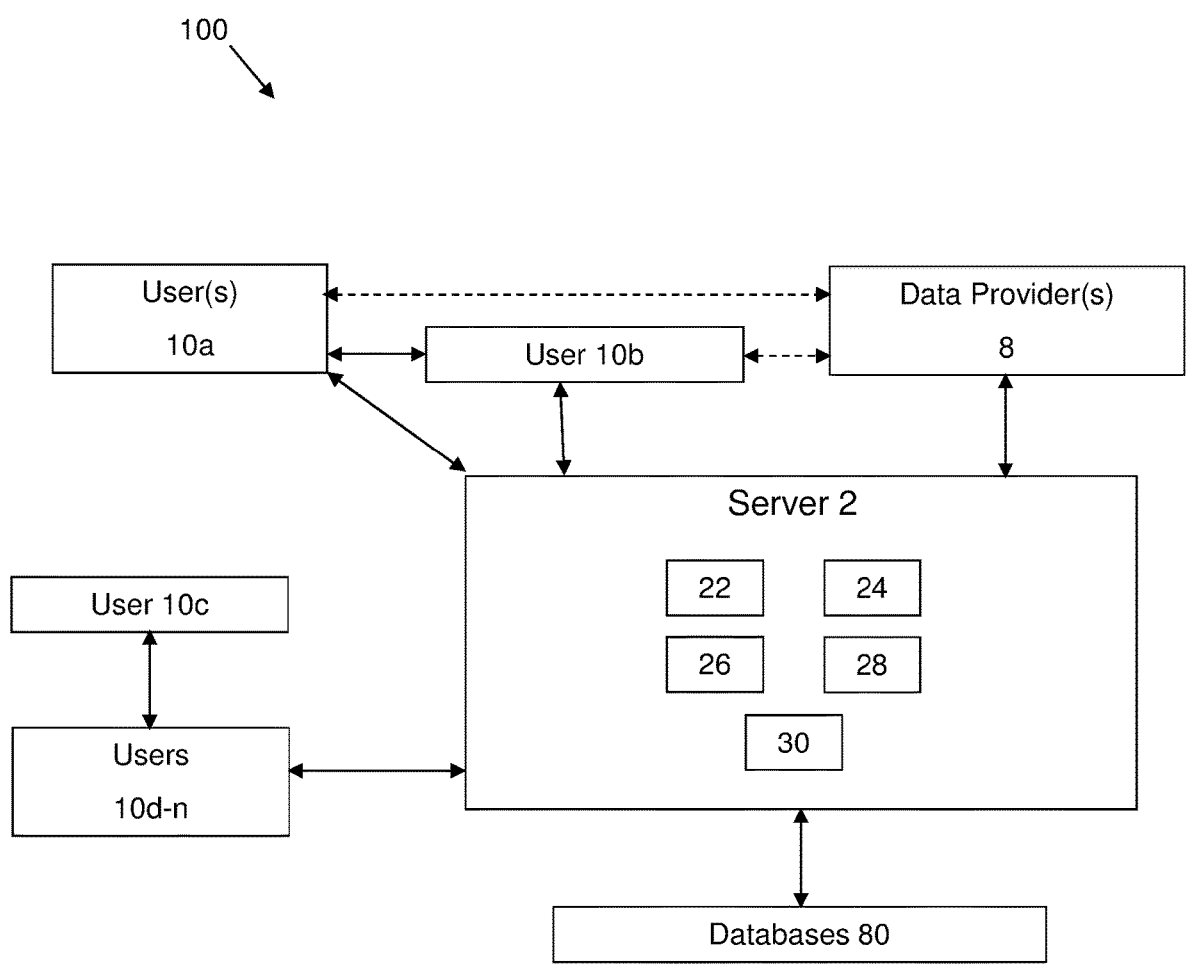
FIG. 1 depicts an exemplary apparatus according to an embodiment.

The following sections I-XI provide a guide to interpreting the present application.

The term "product" means any machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more," unless expressly specified otherwise.

The term "herein" means "in the present application, including anything which may be incorporated by reference," unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating." The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing." The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving." For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect — it is merely a convenient name. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet). Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology Are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device.

Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an Exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™, or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

DETAILED DESCRIPTION OF EXEMPLARY
EMBODIMENTS

In some embodiments, a price discretion value may be determined, e.g., for one or more orders, e.g., by a user, OMS, trading system, or other system component. The price discretion value may comprise an amount (e.g., a maximum amount) by which an order price may be modified so that it can be executed against a counterorder. In some embodiments, a price discretion value may represent an amount by which a bidder is willing to increase a bid price to purchase a trading product, or an amount by which a seller is willing to decrease an offer price to sell a trading product. For example, a trader may input a bid or offer for 100 shares of IBM stock at a price of $27.00 with a price discretion value of $0.30. The order may be communicated and displayed as having a price of $27.00, and may be matched and executed against counterorders having a price of $27.00. Because of the $0.30 price discretion value, the order may also be matched against counterorders with prices that differ from the counterorder by up to $0.30. For example, a bid at $27.00 with $0.30 price discretion may be matched against offers with prices of $27.00-$27.30 (inclusive), and an offer at $27.00 with $0.30 price discretion may be matched against bids with prices of $26.70-$27.00 (inclusive).

In some embodiments, a trader using an order with a price discretion value may not wish to disclose certain information to one or more other parties (e.g., one or more other traders, trading systems, platforms, or other entities), such as (1) the price of the order, (2) the fact that the order is an order with price discretion, and (3) the amount of price discretion. In some embodiments, other traders may not be aware of the $27.00 order at all, or may not be aware that the $27.00 order has price discretion. Thus, in some embodiments, traders who see the order for $27.00 may understand that the order can be executed at the price of $27.00, but they may not know that the order can be executed at other prices within the discretion value range. In some embodiments, information about the trader's order (such as its price, quantity, and/or price reservation) may be kept confidential and may not be displayed to one or more other traders.

For example, various embodiments may be implemented in a darkpool matching environment, such as a darkpool matching environment similar or identical to that of the Aqua system affiliated with Cantor Fitzgerald, or darkpool matching systems similar to those previously offered by Liquidnet and Pipeline. For example, various embodiments may be implemented using components, software, and other features of the systems and methods disclosed in U.S. Pat. No. 8,285,629 to Lutnick et al., which is incorporated by reference herein in its entirety. In some embodiments, orders may not be generally displayed to all traders, but rather each order may be selectively displayed only to traders who satisfy one or more criteria. A firewall or module at one or more trader terminals may receive information about all or a plurality of orders, but may prevent some or all information about the orders (including the existence of the order) from being disclosed to the respective trader. The firewall or module of a trader terminal may further determine that a user satisfies various criteria for a specific one of the received orders (e.g., because a contra order for the same trading product is stored in the respective user's Order Management System (OMS)). As a result, the firewall or module may cause some or all information about the specific order to be disclosed to the respective trader. In this way, a group of traders may disclose information about their orders or OMS in such a way that it remains confidential to all other traders (e.g., screened away from traders by the module or firewall) except to those specific traders who are qualified to see information about the order.

It should be appreciated that various features of the present invention may be used with a "decentralized" darkpool matching system as described in the above paragraph and elsewhere (e.g., wherein remote trader terminals of remote traders perform processing that receives order information from other traders and also determines whether the respective remote trader is qualified to receive information about a specific order), as well as with a "centralized" darkpool matching system (e.g., such as that previously implemented by Liquidnet), e.g., wherein a centralized server or processor determines which specific users may view information (and what information) about another trader's order or trading interest. Various embodiments may also be used with a combination of centralized and decentralized elements. For example, a centralized server may qualify a user to receive information about an order (e.g., based on the user submitting a contra order to the centralized server), and/or the portion of the user's terminal behind a firewall may determine that a user is qualified to receive information about a specific order (e.g., based on the user having previously traded the trading product within the past week). For example, in some embodiments, a user may transmit a discretion order (as described herein) directly to a central server. The central server may transmit information about the order to a plurality of other traders (e.g., to all traders on the network, or only those who are determined by the central processor to be qualified to receive such information).

In some embodiments, a price discretion value may be managed by a trading platform. For example, a user may send an order (e.g., defining a price and quantity for a financial instrument) with a price discretion value to a trading platform. In some embodiments, information about the order (e.g., financial instrument, price, buy/sell side of the order, and/or quantity) may be transmitted and displayed to one or more other entities, such as other traders. In some embodiments, if the trading platform identifies a counterorder that matches the price of the order (e.g., a counterorder having the same price as the order, such as $27.00), then the trading platform may match and execute a quantity of the order against a quantity of the counter-order at the designated price. If there are no counter-orders at the designated price but there are one or more counterorders at a "worse" price within the price discretion value of the order, then the trading platform may match the order against the counter-order at the "worse" price. (For example, a bid of $27.00 with a price discretion value of $0.30 may be matched against an offer having a price of $27.15, which is a "worse" price for the buyer than $27.00). If more than one counteroffer has a price within the price discretion value of the order price (e.g., an offer price within $27.00 to $27.30), then the trading platform may fill the order against counter-orders by preferencing counter-orders that are closest to the original order price. In this manner, the trading platform will seek to fill the order quantity in a manner that executes the order at a "best possible" price (or prices) closest to the original order price.

In some embodiments, a price discretion value may be stored by a matching system. In some embodiments, a discretion value may be stored and/or managed by a trader's OMS.

In some embodiments, the price of an order with a price discretion value may be specified as a range instead of a price and a discretion value. For example, the order may comprise a bid with a bid price of $27.00-$27.30, instead of a bid with a bid price of $27.00 and a price discretion of $0.30. The system may be configured to treat these two types of orders identically, e.g., in terms of disclosing price information, not disclosing price information, and matching and executing the order against suitable counterorders within the price range (or within the price plus or minus the discretion value).

A price discretion value may be selected, specified, and/or determined in a variety of ways, e.g., by a user, trading platform, or OMS. For example, a user may select or otherwise input a price discretion value for one or more orders, e.g., when entering each order. For example, a user may type a discretion value or select a discretion value from a plurality of system-suggested or displayed discretion values. In some embodiments, a user may choose to apply a discretion value to an order (e.g., by selecting an appropriate input) without specifying a specific value for the discretion value. In some embodiments, a user may specify an equation, formula, or algorithm usable to determine a discretion value for a particular order, e.g., based on current market conditions. The discretion value may be a variable value that changes based on time and/or changing market conditions. In some embodiments, a discretion value can decrease over time.

In some embodiments, a discretion value may be determined by a formula or algorithm. In some embodiments, a user may select or specify an algorithm for determining a discretion value, e.g., "bid at NBBO midpoint plus 20% of the difference between the NBBO best bid and best offer, wherein the price of the order changes as the NBBO changes." In some embodiments, the discretion order price range may change over time, e.g., based on an algorithm.

It should be appreciated that in various embodiments, the range may (or may not) include one or more of the outer bounds of the range. For example, if a range is $10-$12, the range would include all tradeable prices in between $10 and $12 (such as $10.01, $10.02, $10.03, . . . , $11.97, $11.98, and $11.99); in some embodiments the range may also include the lower bound of the range (e.g., exactly $10.00); in some embodiments the range may also include the upper bound (e.g., $12.00); and in some embodiments, the range may include both the upper bound and the lower bound. It should be appreciated that a trading system will use a convention that defines whether any defined range includes one or more of the upper and lower bounds of the range. For example, in some trading systems, potentially executable prices may include both the lower and upper bounds of the price range (e.g., such that the range $10-$12 would include both $10.00 and $12.00). It should also be appreciated that some ranges may not have an upper (or lower) bound, such as "greater than or equal to $12" or "less than $10". In some embodiments, a reference price such as an INAV may be used, e.g., instead of an NBBO or midpoint. In some embodiments, an INAV, e.g., for a portfolio, may be continually calculated and updated, e.g., via a computer.

In some embodiments, a first trader may specify one or more price ranges for an order that can be used by an electronic trading system to determine which other traders (if any) are qualified to view information about the order, and that can be used to determine which orders from other traders may be displayed to the first trader. For example, a single price range specified by the first trader may be used (as described herein) to determine the prices of counter-orders that may be shown to the first trader. For example, if the first trader enters or specifies a bid with a price range of $11-$14 when the NBBO is $10-13, then information about contra orders (such as price) from other traders that are within this price range may be displayed to the first trader. Similarly, in some embodiments, this same price range may be used to determine which other traders may view the first trader's discretion order. For example, a second trader who has entered a contra offer at a price of $12 may be eligible to view information about the first trader's bid, e.g., because the second trader's price ($12) is within the first trader's price range of $11-$14. The information that may be output to the second trader, e.g., at a trader terminal or display device of the second trader, may include one or more of the following: (1) information indicating the existence of a contra order; (2) information about a size of the first trader's order (such as the actual size or minimum trade lot); (3) information about the price or price range of the first trader's order, such as (a) the full price range (e.g., $11-$14), (b) a midpoint of the price range, (c) a highest value of the price range, (d) a lowest value of the price range, (e) one or more specific prices included in the price range (e.g., $11.50, which is the midpoint of the NBBO, or $13, which is the current best offer price).

In some embodiments, the first trader may specify one price range that is used to govern which order information is output to the first trader, and a different price or range that governs which other traders are allowed to receive information about the first trader's order (e.g., as described herein). For example, the first trader my enter a bid with a price of $11-14, but specify that the bid should be treated as a bid at the NBBO midpoint (or another price) for purposes of disclosure to other traders and the criteria used to determine which other traders may view information about the first trader's order. In other embodiments, the trader may specify three different prices: (1) a price range for the trader's order, (2) a price or range for determining which other traders may view information about the trader's order, and (3) a price or range that is effectively ascribed to the first trader's order for purposes of disclosing information about the first trader's order to other traders who are qualified to view information about the order. In some embodiments, one or more of these three price types may be specified as formulas, sliding scales, or other algorithms. For example, the first trader may specify (1) $11-$14 price for the actual order, (2) $11-13 price for purposes of determining whether another trader is qualified to view the first trader's order (e.g., if the other trader has a contra order that is within this price range), and (3) an instruction to display a price of $1 below the other trader's contraorder price to other traders qualified to see information about the first trader's order if the qualified other trader has a counterorder, or otherwise display the NBBO midpoint to qualifying traders as the price of the first trader's order.

In other embodiments, the first trader may specify that other traders may not receive any information about the first trader's order.

Exemplary System

FIG. 1 depicts an exemplary apparatus according to an embodiment.

The system 100 may comprise one or more servers 2 coupled to one or more databases 80, one or more data providers 8a-8n, and one or more end users 10a-10n. The data providers 8a-8n, users 10, and server 2 may each communicate with each other. Users 10 may also communicate with other users 10, e.g., regarding a game, wager, and/or financial indicator.

Server 2 may comprise one or more processors, computers, computer systems, computer networks, and or computer databases. The one or more processors may execute software instructions, e.g., stored on computer-readable media, to perform the computer-implemented steps described herein. Server 2 may comprise modules 18-64. Server 2 may also comprise one or more databases, such as databases 80. Server 2 may communicate with users 10, and data providers 8. For instance, server 2 may communicate with a user 10 computer, such as a browser of a user computer, e.g., over the internet.

Server 2 may comprise an order book matching system, a trading platform, or other trading system or entity described herein.

Databases 80 may comprise one or more processors, computers, computer systems, computer networks, and/or computer databases configured to store information. Each of databases 80 may communicate with server 2, e.g., via one or more modules of server 2. For instance, server 2 and modules may store information in databases 80 and may also use information stored in databases 80.

Users 10a-10n may comprise one or more human persons, one or more user workstations, and/or one or more hardware or software modules that interact with other users and/or central server. Users may comprise traders, trader workstations, and other trading entities. Users 10 may interact with server 2, and/or other users 10. As used in this application, users 10a-10n may also refer to a user's interface to other system 300 components (like server 2), such as a user's PDA or computer or a program running on a user's computer such as a computer web browser like Internet Explorer™, which may communicate with data providers 8 and/or server 2.

Data provider(s) 8 may comprise any person, processor, information service, or other entity that publishes or otherwise provides information concerning a game, wager, financial market, financial indicator, random number generator, or communication related thereto, to server 2, and/or users 10. For example, a data provider 8 may comprise an entity that provides game-related information, wager-related information, and/or market information such as current prices and values of markets, indices, metrics, and other financial information described herein, such as a market data service, website, or other source of information relevant to gaming or financial markets, or any other information used by system or server as described herein.

Data provider 8 may provide information in real time, as information first becomes available to the general public, or at another time. Data provider 8 may provide such information in any one or more of a variety of forms and means such as video, audio (e.g., radio broadcast), text (e.g., stock ticker-type information), or other data that may convey information concerning games, wagers, financial markets, and other information. Data may be provided at a variety of different timings. In some embodiments, data may be provided in periodically, continuously, or continually, e.g., via a data feed (e.g., a stream of data that includes real time updates of event information, such as a running commentary of a game in text or audio format).

Data providers may comprise entities that provide market information, e.g., regarding prices, quantities, and trades in various trading products, e.g., in real time or substantially real time.

The server 2 may comprise a computer, server, hub, central processor, or other entity in a network, or other processor. The server 2 may comprise input and output devices for communicating with other various system 300 elements.

In some embodiments, the server 2 may be comprised in an end user's computer 10, e.g., as a toolbar in a user's web browser or another program running on the user's computer.

As shown in FIG. 1, the server 2 may comprise a plurality of modules, such as modules 22-34. Each module may comprise a processor as well as input and output devices for communicating with other modules, databases, and other system elements.

User interface module 22 may communicate with users, and enable users to communicate with server and other users. User interface module 22 may cause information to be output to a user, e.g., at a user output device such as a display device (e.g., a display device at a user terminal), and/or a speaker. For example, user interface module 22 may generate interactive user interfaces as shown in various figures described herein. The information outputted to a user may be (or be related to) a user account, one or more orders, order parameters or specifications, prices, price ranges, selectable options (e.g., for specifying order parameters), pop-ups, confirmation windows, order submission indicia, and other information described herein. User interface module may communicate such information electronically, e.g., via networked communication such as the internet (e.g., in an email or webpage), telecommunication service, etc. In some embodiments, user interface module 22 may comprise input devices for users to input information about one or more orders, parameters, or other information.

User preferences module 24 may receive, identify, or determine user preferences concerning one or more orders, prices, parameters, order execution rules or preferences, and other information. For instance, the module may receive the preferences from a user interacting with a user interface. The module may also receive them from an automated user terminal. The module may also determine them based on a program that automatically determines user preferences concerning one or more orders, prices, and other information.

Order module 26 may determine information about orders, e.g., based on information determined by server and/or received from one or more data providers. For example, order module may determine which trader or traders are qualified to view an order, act on an order, or otherwise receive some or all information about an order. For example, order module may identify a trader who is eligible by virtue of the trader's discretion order (or other order, or prior or current trading activity, etc.) to accept or reject another order.

Execution module 28 may match and/or execute orders, e.g., by matching and executing all or part of a quantity of an order and a contra order. Execution module 28 may also transact payment between users related to orders, e.g., by transferring payment from a purchaser to a seller. Execution module 28 may also credit and debit the user's account.

As shown in FIG. 30, a database 80 may be coupled to the server 2. Databases 80 may store information about orders, financial data, and other information, such as historical information about user trading activity. The modules of server 2 may store, access and otherwise interact with various sources of data, including external data, databases and other inputs.

The modules may function separately or in various combinations. While the modules are shown within a single server, the modules may also operate among several servers. The modules may communicate with a plurality of databases, which may also function collectively or separately.

Exemplary Method

Figure 2:
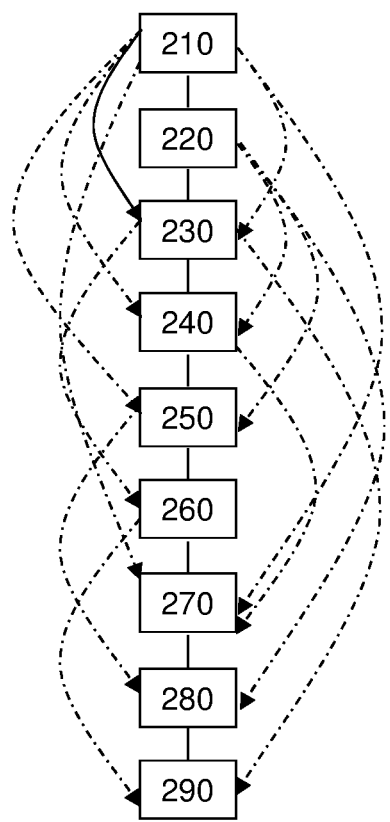
FIG. 2 depicts an exemplary flow chart according to an embodiment.

FIG. 2 depicts an exemplary flow chart according to an embodiment.

Block 210. One or more trading platforms may receive one or more orders from one or more trading entities. A trading platform may comprise a matching order book. The orders may comprise bids and offers for a trading product, such as a financial instrument. The orders may comprise various prices, including a best bid price and a best offer price (e.g., an NBBO best bid or offer price). Each trading entity's orders may be stored in an OMS associated with the trading entity. One of the orders may comprise a first order from a first entity to sell 500 shares of IBM stock for $27.15. The first order may comprise a firm order, and the trading product of the order (such as 500 shares of IBM stock) may be reserved for execution in the first entity's OMS. Another order may comprise a second order to sell 20 shares of IBM stock for $27.10, and another may comprise a third order to sell 1000 shares for $29.10. The second and third orders may or may not be firm orders.

In some embodiments, one or more of the first, second, and third orders may have price discretion values that enable those orders to be executed at prices different from the identified (base) price. For example, the third order may comprise an order to sell 1000 shares for $29.10 with a discretion value of $2.00 (e.g., sell at $29.10 or as low as $27.10).

Block 220. A trader may submit an order comprising a price discretion value. The order may specify a trading product, a quantity of the trading product, a price of the order, and a discretion value for the price. In some embodiments, the order may specify other information, such as a minimum fill value and/or an order code associated with rules and/or criteria for processing the order (e.g., a code that indicates that the order is a price discretion order that is authorized to be executed up to the limit of the price plus the discretion value). The order may be stored in the trader's OMS, and details about the order, e.g., including the price discretion value, may be stored in the trader's OMS. In some embodiments, the trader's order may be a firm order. In some embodiments, the order may be communicated to the trader's Aqua module.

In some embodiments, an order may specify a reference price such as an NBBO price or midpoint price (i.e., midpoint price between the NBBO best bid and best offer) as well as a discretion value or maximum price. In some embodiments, the reference price could be an INAV. In some embodiments, the order may be processed using systems and methods similar to those described herein, except that the NBBO or midpoint price may be used as the "base price" and the discretion value or maximum price may define the maximum price (for a bid) or minimum price (for an offer).

In some embodiments, these orders may be considered "NBBO discretion orders" or "midpoint discretion orders."

For example, when the NBBO for a trading product is $10 bid and $12 offer, specifying a "$13 bid" may be interpreted as a bid that can be executed at any price between $11 (the midpoint of the NBBO) and $13, e.g., including (or not including) $11 and including (or not including) $13. Alternately, specifying a "$13 bid" may be interpreted as a bid that can be executed at any price between $10 (the NBBO bid) and $13, e.g., including (or not including) $10 and including (or not including) $13. Alternately, in yet another embodiment, specifying a "$13 bid" may be interpreted as a bid that can be executed at any price between $12 (the NBBO offer) and $13, e.g., including (or not including) $10 and including (or not including) $13. Similar rule sets could equivalently be applied to submitting offers. For example, a "$9 offer" specified by a trader may be interpreted by the trading system as an offer having a minimum price of $9 and a maximum price of $10 (NBBO bid), $11 (NBBO midpoint), or $12 (NBBO offer), depending on how the system is configured. In other embodiments, bid and offer prices may be automatically tied to an NBBO midpoint, bid, or offer. For example, a bid that specifies "+$3" could be interpreted to mean a bid at the NBBO midpoint (or NBBO bid, or NBBO offer) with a discretion value of up to $3, thereby defining a range of possible execution prices of $11-$14 (using NBBO midpoint), $10-$13 (using NBBO bid), or $12-$15 (using NBBO offer), including (or not including) the lower value of the range and including (or not including) the higher value of the range. Allowing users to enter price ranges in this way may be more convenient for some traders. In some embodiments, users may define a price range for an order by specifying both the lower value and the higher value; in some embodiments, users may also indicate whether the lower (and upper) values of the range are included in the range.

The order may comprise an order of a specific type, e.g., a limit order, up to the maximum price (for bids) or minimum price (for offers). In some embodiments, the maximum or minimum price may be specified indirectly by specifying a base price (e.g., NBBO or midpoint) and a discretion value (e.g., an amount to add (for bids) or subtract (for offers) to determine the maximum or minimum price).

In some embodiments, the trader's order may comprise a price that is equal to or better than the NBBO price (e.g., wherein a "better price" for the trader's bid would be a higher price, and a better price for the trader's offer would be a lower price). For example, the trader's bid price of $27.00 for IBM stock may be equal to or better than (e.g., higher than) a current NBBO bid price of $26.90. In some embodiments, the trader's bid price may be deemed equal to or better than an NBBO bid price as long as a portion of the price range defined by the price discretion value is greater than (e.g., higher than) or equal to the NBBO. For example, if the NBBO of IBM stock is $27.25 bid and $27.50 offer, the trader's order may be considered equal to or better than the NBBO bid price because the trader's price range includes $27.25-$27.30.

According to various embodiments, the price range of such a "discretion value order" may be expressed or defined in a variety of ways. For example, a specific price and specific range may be specified, e.g., "a bid of $27.00 that can be increased by up to $0.30." In another example, a range of specific prices may be specified, e.g., "bid of $27.00-$27.30" (or "offer of $27.40-$27.25", e.g., an "offer of $27.40 that can be decreased by up to $0.15, down to $24.25"). Alternately, price ranges may be expressed with reference to another metric such as an NBBO bid, NBBO offer, or other reference value, such as a midpoint between the NBBO best bid and best offer. For example, an order price may be expressed as "bid at NBBO best bid price plus up to $0.30," "offer at NBBO best offer price minus $0.35," "bid at NBBO midpoint plus $0.15," or "offer at NBBO midpoint minus $0.10."

In some embodiments, the trader may submit the order to an Aqua module that communicates with Aqua modules of other traders. The Aqua module of each trader may comprise a computer application that communicates with other similar modules of other traders such that enables certain confidential information to be displayed to some traders and not to other traders. For example, if traders A, B, C, and D submit orders a, b, c, and d to their Aqua modules, respectively, the various orders may be selectively communicated among the traders. For example, traders C and D may see order a but not order b, while only trader A is enabled to view order d. This may be accomplished by one or more of their respective Aqua modules confidentially filtering information about the orders so that only qualified traders can view the information. In this way, one trader can submit an order that is communicated only to zero, one, or a plurality of specific traders (e.g., who satisfy criteria) such that the various traders remain anonymous from one another. In some embodiments, the system may notify a submitting trader if and when his order was disclosed to another party. In other embodiments, the fact that a trader's order has been disclosed to another party may not be disclosed to the submitting party, or such disclosure may be delayed.

In some embodiments, the trader's OMS may reserve trader funds or trading products in the trader's account that would be necessary to execute the order. For example, the trader's OMS may reserve 100 shares of IBM stock in the trader's account if the trader submits a firm order to sell 100 shares of IBM stock. In some embodiments, the order may be submitted to one or more trading platforms. For example, the trader may submit an order to purchase 600 shares of IBM stock for $27.00 with a discretion value of $0.30 (e.g., a price of $27.00 that can be increased up to $0.30 to $27.30). The order may also specify a minimum fill quantity of 100 shares. The trader's order may not yet be matched or executed against any other order, such as a displayed order at a trading platform. However, in some embodiments, the trader's order may match an order that has not been communicated to the trader, such as an order from a first entity to sell 500 shares of IBM stock for $27.15.

In some embodiments, the system may notify a trader of any contra orders (e.g., orders for the same trading product on the opposite buy/sell side) that are better for the trader than the range identified in the trader's order. (From the trader's perspective, a better contra order price is lower for a contra offer and higher for a contra bid.) For example, a trader who is bidding a range of $27.00-$27.30 is specifically interested in offers in that price range, and may also be interested in offers to sell priced below that range (e.g., offers at $26.00), to the extent such better-priced orders exist. In some embodiments, the system may assume that all traders are willing to trade at "better prices," and thus may automatically notify traders of such orders, e.g., via a pop-up or other executable notification as described herein.

In some embodiments, the trader may submit the order to a centralized server that processes orders and determines which traders may view and execute orders including the traders order and the orders from the other trading entities. In some embodiments, the central server may comprise a matching order book. The central server may facilitate the other blocks described herein.

Block 230. The trader's order may be displayed, e.g., to one or more other traders. In some embodiments, however, the trader's order may not be displayed to any other traders.

Block 240. The trader's order may be executed in whole or part, e.g., against one or more contra orders. For example, a trader who views the order may hit or lift all or a portion of the order. In some embodiments, all or a portion of the order may be disclosed to a qualified trader via an Aqua module, and the qualified to trader may hit or lift the order. In other embodiments, the order may not be executed at all, in whole or in part.

Block 250. An Aqua module at the trader's workstation may qualify the trader to view one or more orders, e.g., orders for trading products that may be of interest to the trader, or orders that the trader is qualified to see based on one or more qualification criteria (as described herein). In some embodiments, a trader may be qualified to view an order based on one or more criteria, such as the trader's past trading behavior (e.g., whether the trader has recently traded the trading product), the trader's OMS (e.g., whether the trader has a current order for the trading product that is contra to the order in question), a trader's preferences (e.g., a preference to see all orders of a specific type or class of financial instrument), and/or other criteria. In some embodiments, an Aqua module may qualify a trader to see a particular order if the trader has a current contra order that is executable against the particular order (e.g., automatically executable, or in some embodiments executable upon confirmation by the trader). For example, the Aqua module may qualify the trader to see the first order to sell 100 shares of IBM stock at $27.15 if the trader's OMS shows that the trader has an outstanding order to buy at least 100 IBM shares at a price of up to $27.30.

In some embodiments, a trader's order may qualify the trader to see a contra order only if the trader's order is at the current NBBO for the trading product, or within a particular range of the NBBO (e.g., within one or two standard trading price increments, or within 1% or 2% of the NBBO). For example, a trader may be qualified to view a $27.15 IBM offer if the trader's OMS shows an active IBM bid at the current NBBO best bid price, e.g., an executable bid that is a firm bid at the NBBO price (e.g., a bid that would automatically execute at the NBBO bid price).

In some embodiments, qualification criteria may determine which contra orders are displayed to the trader. In some embodiments, a trader may be qualified to see a contra order if the trader has an active order in the trader's OMS, or has a history of trading the relevant trading product or type, or has traded the product or product type (or a sufficient volume of such product or type), e.g., within a certain period of time. Other examples of qualification criteria that may govern the disclosure of an order (e.g., for viewing an order, or having an order "pop up" on a trader's screen) are discussed in U.S. Ser. No. 13/888,352, filed May 6, 2013, the disclosure of which is incorporated by reference herein its entirety. In other embodiments, the order may be automatically disclosed, e.g., to all traders.

Block 260. One or more orders, such as the first order, may be communicated to the trader. The order may comprise an Immediate or Cancel (IOC) order. In some embodiments, the order may be communicated to the trader based on a determination that the trader is qualified to view the order, e.g., based on the trader's OMS having a contra order for the same trading product with a price (or price range) that matches the order. For example, if the Aqua module qualifies the trader to view a particular order, then the order may be displayed to or otherwise communicated to the trader. For example, a pop-up window may display the order details, such as the name of the financial instrument or other trading product, a quantity offered for purchase or sale, and/or the price (or other information about the price, such as an equation defining a plurality of prices and quantities for the order).

In one example, the trader may be qualified to view the first entity's first order to sell 500 shares of IBM stock for $27.15 because the trader's OMS has a record of the trader's order to buy 600 shares of IBM stock for $27.00 up to $27.30. Notably, the first order at $27.15 may be displayed to the trader even though the base price of the trader's order ($27.00) does not match the $27.15 price of the first order. However, the range of prices encompassed by the trader's price and discretion value (i.e., range of $27.00 to $27.30) may include a price ($27.15) that matches the $27.15 price of the first order from the first entity.

In some embodiments the trader may be qualified to view the second order to sell 20 shares for $27.10, e.g., based on the price being within the price discretion range. In other embodiments, the trader may not be qualified to view the second order, e.g., based on the quantity being below a minimum fill value of the trader's order.

In some embodiments, the trader may be qualified to view the third order, e.g., based on the trader having a contra order in his OMS in the same trading instrument (IBM stock) as the third order. In some embodiments, even though there is no price that would overlap the two orders, the order may be displayed to the trader and the trader may be given an opportunity to increase his bid or discretion value, or to begin a negotiation with the trading entity who submitted the third order. In some embodiments, the trader may not be qualified to view the third order, e.g., based on the trader's order having a price range (including discretion value) that does not match the third order's (base) price of $29.10. In some embodiments, if the third order has a discretion value of $29.10 minus up to $2.00 (i.e., $27.10-$31.10), the trader may be qualified to view the order because their price ranges overlap (e.g., between $27.10 and $27.30). In some embodiments, the trader may not be qualified to view the third order, e.g., based on the trader's order having a quantity (e.g., 500) that is less than the quantity of the third order (e.g., 1000); or if the third order has a minimum fill size (e.g., 600 shares) that is greater than the total quantity of the trader's order (e.g., 500 shares).

In some embodiments, the trader may only be qualified to view an order for a trading product if the trader has a contra order in his OMS with a price that is deemed equal to or better than the NBBO price for that trading product.

Block 270. The trader may be offered an opportunity to execute all or a portion of the order. For example, a pop-up window displaying the order may comprise a selectable execution button that, when selected, causes the trader to execute the order (e.g., by hitting a bid order or lifting an offer order). In some embodiments, the trader may also be offered an opportunity to submit a counter-order, e.g., at a different price or quantity. For example, the trader may be enabled to modify a price or quantity of the displayed order.

Block 280. The trader may initiate an execution of at least a portion of the order. For example, the trader may select an execution button that, when selected, initiates execution of the order. In some embodiments, selecting the button may cause an Immediate Or Cancel (IOC) order to be issued against the order. For example, the act of the trader selecting the button may initiate hitting of the bid (if the order is a bid) or lifting of the offer (if the order is an offer). In the present example, the trader may initiate execution of the first order to sell 500 shares of IBM stock for $27.15, e.g., by submitting an Immediate or Cancel (IOC) order against it.

Block 290. At least a portion of the order may be executed, e.g., based on the trader's instruction to execute at least a portion of the order. For example, the trader may purchase 500 shares of IBM stock at a price of $27.15 per share.

In some embodiments, order execution may be facilitated by an integration between the trader's OMS and an Aqua module that causes orders (such as the first order) to be displayed to the trader. In some embodiments, the trade may be executed substantially instantaneously, e.g., without further action by the trader or the first entity. In some embodiments, the fact that the first order has a price ($27.15) that does not match the trader's order's base price ($27.00) does not delay execution of the order because the execution price of $27.15 is pre-authorized in the trader's OMS. In some embodiments, the funds (or trading instruments) associated with the trader's order may be reserved in the trader's OMS, thereby facilitating immediate execution of the first order.

Another Exemplary Method

Figure 3:
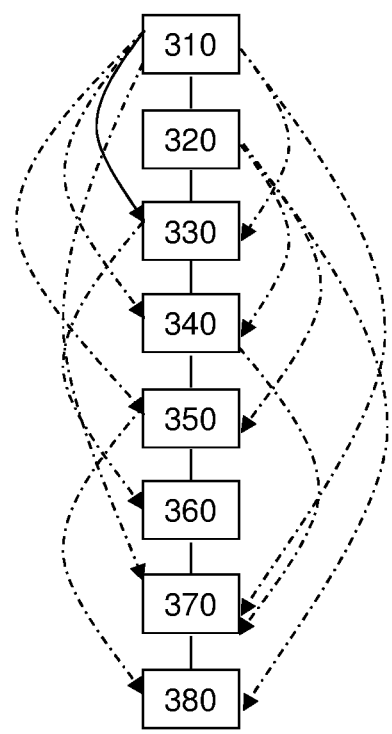
FIG. 3 depicts an exemplary flow chart according to an embodiment.

FIG. 3 depicts an exemplary flow chart according to an embodiment.

Block 310. Various traders may submit orders, e.g., to one or more ECNs, trading platforms, and/or other computer systems. The orders may comprise various bids and offers for various quantities of a trading product (such as a financial instrument) at various prices. The orders may represent "the order book" or market data, e.g., concerning a financial instrument. In some embodiments, some or all of the orders may be disclosed to other traders. In some embodiments, one, some, or all of the orders may not be disclosed to other traders.

Block 320. A trader may specify an order. For example, a trader may specify order criteria for an order, such as an order price or price range (e.g., a high and/or low end of a price range), a trading side (e.g., bid or offer), a trading product (e.g., a specific financial instrument), a quantity, a time limit, conditions for cancelling or modifying the order (such as a time limit or a specified change in the NBBO that could trigger cancelling or modifying the order), a type of order (e.g., good until cancelled, limit order, immediate or cancel), whether and/or under what conditions the order is "firm," and other criteria. In some embodiments, the trader may specify a price range according to any manner described herein, e.g., by specifying a spread amount (e.g., $0.30), a reference price (e.g., NBBO midpoint or other price), and/or the high and low bounds of the range.

In another example, the trader may define an NBBO discretion order or a midpoint discretion order. In some embodiments, the trader may enter the order in part by specifying a trading product (e.g., a financial instrument), a side of the order (e.g., bid or offer), a maximum price (for a bid) or minimum price (for an offer), and NBBO indicia (e.g., for an NBBO discretion order) or a midpoint indicia (e.g., for a midpoint or NBBO midpoint discretion order).

Block 330. The trader's OMS may reserve a quantity of the trading product based on the trader's order specifications. For example, if the order specifications may specify a firm offer to sell 100 shares of IBM stock, then the trader's OMS may reserve 100 shares of IBM stock in the trader's OMS. (In some embodiments, the trader's OMS may reserve the relevant quantity of shares only under certain circumstances, e.g., only while the NBBO price is within a range specified by the trader. In some embodiments, the trader's OMS may not reserve the quantity of the trading product, or may reserve the quantity only after one or more conditions are satisfied.

Block 340. A trader workstation of the trader may generate an order message for a trading platform based on the trader's order specification. For example, if a trader specified a bid for a quantity of a trading product at a price of "NBBO midpoint up to NBBO midpoint plus $0.30" when the NBBO midpoint is $15.50, the trader's workstation may generate a bid for the quantity of the trading product at a bid of NBBO plus $0.30 (or, in some embodiments, it may generate a bid at $15.80, which is $0.30 above the current NBBO midpoint). The order message may be in a form of a traditional order, e.g., a traditional order for a specific quantity at a specific single price. In some embodiments, the order message may include a code or instruction indicating that the order should be interpreted as a discretion order (e.g., defining a price range) rather than a traditional order with a single price.

In some embodiments, the order message may comprise a limit order. In some embodiments, such order may be priced through the NBBO (national best bid and offer), such as a bid priced higher than the NBBO offer, or an offer priced lower than the NBBO bid.

Block 350. The order message may be transmitted, e.g., to a central server or trading platform (such as a matching order book), e.g., by a trader or trader workstation (e.g., of the trader who originated the order). In some embodiments, the order message may be transmitted directly to a plurality of other traders, e.g., with or without transmitting the order to a central server. In some embodiments, the order message may be transmitted to trader modules of trader workstations, wherein the trader module is screened off from the trader such that information about the order messages transmitted to the trader module cannot be communicated to the trader, unless certain criteria are met. For example, information about the existence or price of the order may remain confidential unless one or more criteria are met. In some embodiments, the order may be configured such that it is not disclosed and/or not made disclose-able to other traders.

In some embodiments, one or more order messages described herein may be transmitted via SMS (short message service), email, FTP, or other communication protocol or means. For example, a trader may submit an order (e.g., to a central server) via SMS on a mobile phone. The trader may receive responsive messages, e.g., via SMS or email, e.g., at the trader's mobile phone or computer. In some embodiments, a third party may be used as a centralized message delivery service, e.g., so that trading participants do not know which trader originated an order or trade-related message. In this way, a central messaging facility (such as Bloomberg) can receive, track, and route all messages while preserving the anonymity and confidentiality of various information such as who originated an order.

Block 360. The trading platform, one or more trader modules, and/or a central server may receive the order message (e.g., via email, SMS, or other protocol). (In some embodiments, other traders may not receive the order message.) The trader module, central server, and/or trading platform may interpret the order message as the order specified by the trader, e.g., a discretion order bid for a quantity of a trading product at a price of "NBBO midpoint up to NBBO midpoint plus $0.30". In other words, the central server may determine the specification of the order based on the order message, even though the order message might otherwise look the same as a traditional order at a single price (e.g., a bid at $15.80, rather than a bid at $15.50-$15.80), such as a traditional limit order priced through the NBBO.

In some embodiments, a trader's submission of a bid for a trading product that is priced higher than the current best offer for the trading product (e.g., the current best NBBO offer) may be interpreted by a trading system (or central server or individual firewalled trader module) as a bid that is firm and executable at the current midpoint price (e.g., midpoint between best bid price and best offer price of NBBO). Such bid may also be interpreted as a request for the trading system to notify the trader about any offer (and/or any bid and offer) priced between the midpoint and the order price (e.g., the limit price of the bid). The trading system may send the trader such notices as a result (e.g., via a central server for a "centralized" system or via individual trader modules in a "decentralized" system). Notice of an order may comprise an indicia on a trader interface that is selectable by the trader to execute such contra order. For example, such notice may comprise a pop-up window that describes the order (e.g., price, size, trading product, bid/offer side, and/or other information) and enables the trader to execute against such order, e.g., by a single action (e.g., clicking on or touching an "execute" button associated with the contra order, or speaking the word "execute").

Similarly, in some embodiments, a trader's submission of an offer for a trading product that is priced lower than the current best bid for the trading product (e.g., the current best NBBO bid) may be interpreted by a trading system as an offer that is firm and executable at the current midpoint price (e.g., midpoint between best bid price and best offer price of NBBO). Such offer may also be interpreted as a request for the trading system to notify the trader about any bid (and/or any bid and offer) priced between the midpoint and the order price (e.g., the limit price of the offer). In some embodiments, the order may not be treated as firm and executable at any price, but may be interpreted as a request to send the notices regarding matching contra orders.

Block 370. The various orders (e.g., discretion orders and other orders) may then be processed as described elsewhere herein. For example, information about one or more contra orders may be communicated to the trader, e.g., based on the trader's submitted discretion order, and based on the contra order having a price within the price range of the discretion order. In some embodiments, information about the contra order may be communicated to the trader as a result of the trader showing a clear intent to trade (e.g., based on the fact that the trader submitted the discretion order, which indicates the intent to trade, or based on the trader's order quantity being reserved in the trader's OMS for the range of discretion prices). The contra order may be communicated, e.g., via a pop-up window at the trader's terminal. In some embodiments, a price of the contra order may be communicated (and all or some of the contra order's quantity, in some embodiments) to the trader, e.g., in a pop-up window.

If it is determined (e.g., by the trader's terminal (e.g., via firewalled module), or by a central server) that a contra order has a price that matches the trader's discretion order price range, the trader may be presented with one or more selectable options (e.g., via an SMS text message, or via selectable buttons, e.g., on a touch-screen), such as: (1) execute all or a portion of the trader's discretion order against all or a portion of the contra order; (2) do not execute against the contra order, e.g., and dismiss the notification; and (3) cancel the trader's discretion order, and do not execute against the contra order. In some embodiments, a trader may select a particular option by pressing the relevant button or making other appropriate instruction (e.g., by sending a responsive text message that says "Y" (yes trade), "N" (no, don't trade), or "NC" (don't trade, and cancel the original discretion order)). In some embodiments, the trader may only have the option to execute (all or portion) or cancel his own order. (For example, it may be determined that if the trader is choosing not to trade, then the trader must not have a clear intent to trade.) In some embodiments, failure to select to trade may cause the system (e.g., central server or trader modules) to stop sending order information to the trader triggered by the trader's discretion order. For example, additional contra orders with an overlapping price may not be disclosed to the trader, and the trader may not have the opportunity to trade against those orders.

In some embodiments, the opportunity to trade may indicate a quantity that would be traded. For example, the quantity may comprise the smaller of the trader's discretion order quantity and the other trader's contra order quantity. In some embodiments, this quantity will appear in the pop-up (or text message or email), e.g., together with a minimum lot size. In some embodiments, the trader may elect to execute all of the indicated quantity or a smaller amount, provided it satisfies the contra party's minimum lot size and any other requirements.

In another example, the bid may be immediately executed at the NBBO midpoint (e.g., $15.50). If not, or if a portion is still remaining, then if a counterorder is received (e.g., by the central server or the trader's firewalled module) that is within the discretion price range, such order may be communicated to the trader, and the trader may have the option of executing all or part of it (e.g., via a pop-up window that displays the counterorder and a selectable indicia for executing the counterorder). In some embodiments, the trading system may cancel the order, e.g., based on certain criteria, e.g., criteria specified by the trader and embodied in the order message. For example, the trading system may cancel the order after a trader-specified period of time, such as 5 or 10 seconds or 5 or 10 minutes.

It should be appreciated that minimum lot sizes and other requirements may be enforced via the display and or processing of the various order messages. For example, a minimum lot size may be communicated with a pop-up opportunity to trade against a contra order.

In some embodiments, matching orders may be executed automatically, without further input from the two trading counterparties. In other embodiments, a trade will be executed only after a confirmation (e.g., via pressing a confirm button on a pop-up window or confirming via SMS) from one or both of the trading parties.

In some embodiments, any resulting trades involving the discretion order may be executed at the price of the contra order. In some embodiments, the price of execution may be a different price, e.g., that is determined based on the contra order price and the discretion price order range. For example, in some embodiments, the trade may be executed at the midpoint of the discretion order price range, or an average of the NBBO midpoint and the discretion price order range. In embodiments where the contra order is also a discretion order with a price range, the execution price may be the midpoint of the overlapping price range. Other pricing algorithms may be used.

Block 380. The system may process and monitor market data such as incoming bids, offers, and NBBO price changes. The system may identify a change in a reference price upon which the order is based (e.g., an NBBO best bid, best offer, and/or midpoint price). The system may modify the discretion order based on such changes, e.g., as described herein.

It should be appreciated that NBBO midpoint (or other reference price) may change during the pendency of a discretion order. In some embodiments, the order price may automatically change based on the price change. For example, a "midpoint plus $0.50" bid entered when the NBBO midpoint is $25.00 may initially be considered to be a discretion order with a price range of $25.00-$25.50. While the order is pending, the NBBO midpoint may increase $0.25 to $25.25. In this case, the order price range may change by the same amount, thus effectively changing the order's price range to $25.25-$25.75. In other embodiments, the $0.25 increase may cause the base value of the order to change, but not the maximum discretion price. For example, when the NBBO price increases to $25.25, the order may effectively have a new price range of $25.25-$25.50 (such that the maximum price of the order remains $25.50, regardless of any change in reference price). In some embodiments, the order may be cancelled, or temporarily suspended, if the reference price moves outside the discretion range. For example, if the NBBO midpoint increase to $25.60, then the original $25.00-$25.50 bid may be suspended or cancelled.

Alternately, if the NBBO price decreases to $24.40, the order price range may also decrease to $24.40-$24.90. Or, in some embodiments, the lower range may decrease correspondingly while the maximum remains constant (e.g., order price becomes $24.40-$25.50). Any permutation and combination of changing and not changing the upper and lower ranges of the initial order price may be considered.

In some embodiments, an order may be automatically cancelled or suspended based on various criteria or conditions, e.g., whenever the reference price (e.g., NBBO midpoint) increases (or decreases) by a predetermined amount (e.g., a percentage of the upper or lower range (or midpoint) of the order price, such as 1%), or increases (or decreases) by a predetermined amount of the order's price range (e.g., the price increases by an amount equal to 20% of the range defined by the discretion order when originally received).

In some situations, a trader may not execute a contra order that matches the trader's discretion order (e.g., after a pop-up window displays the contra order and the user is given a period of time to act on it, such as 2, 3, 5, or 10 seconds). In such cases, the system may continue to notify the trader of contra orders that match the trader's discretion prices. In some embodiments, the system may automatically interpret such inaction as a request to decrease the price range of the discretion order, e.g., such that the price window is bounded by the price of non-execution. For example, if the discretion price range on a bid is $12.20-$12.80 and the trader does not execute against an offer at $12.60, the system may automatically convert the discretion order price range to $12.20-$12.60.

Example 3: Various Discretion Order Examples

Further examples may help to illustrate various embodiments described in FIG. 2. The following examples assume that at 1:00 pm, the NBBO best bid is $10.00 for trading product ABC, the NBBO best offer is $11.00, and thus the NBBO midpoint is $10.50.

(i) User A submits a limit order bid for 100 units of ABC at a price of $10.90. The system interprets this order as a firm bid for 100 units of ABC at a price of $10.50, and an instruction to notify the user of any offers for ABC at prices greater than $10.50 up to and including $10.90. The system automatically executes the bid against an existing offer to sell 40 units of ABC at the midpoint price of $10.50. After execution, user A has an outstanding firm bid for 60 units at $10.50. The system notifies user A of an existing offer to sell 10 units at $10.70 and another offer to sell 15 units at $10.80, e.g., by providing user A with a indicia associated with those orders that is selectable by user A to execute against the orders. In some embodiments, the system may immediately publish information about the trades; in other embodiments, such publication may be delayed, or not published at all. User A may execute the offer at $10.70 but not execute the offer at $10.80, and thus has 50 units remaining in the order. In response, the system converts the price range of the order from $10.50-$10.90 to $10.50-$10.80, wherein the bid is firm at the price of $10.50.

The system may determine that the NBBO best bid has decreased to $9.00 and the NBBO best offer has decreased to $10.20, such that the NBBO midpoint is now $9.60. Based on this change, the system may cancel the order, modify the order, and/or request user A to re-confirm the order or changes to the order. In some embodiments, the system may automatically convert the order into a firm bid for 50 units at a price of $9.60, with a request to notify the user of any offers at prices up to $10.90. In some embodiments, the maximum price will instead be converted to $10.20 (the current NBBO best offer) or $10.10 (which is $0.50 greater than the NBBO midpoint, like the original maximum price).

(ii) User A submits a limit order bid for 100 units of ABC at a price of $10.50 with discretion of up to $0.70 (defining a price range of $10.50-$11.20). The system interprets this order as a firm bid for 100 units of ABC at a price of $10.50, and an instruction to notify the user of any offers for ABC at prices greater than $10.50 up to and including $11.20. The system automatically executes the bid against an existing offer to sell 40 units of ABC at the midpoint price of $10.50. After execution, user A has an outstanding firm bid for 60 units at $10.50. The system notifies user A of an existing offer to sell 10 units at $10.70, e.g., by providing user A with an indicia associated with the order that is selectable by user A to execute against the order. The user executes it, and has 50 units remaining in the order. The system receives another offer to sell 15 units at $10.80, and then transmits a selectable indicia to user A for executing the order. User A does not execute the order. The system receives and then transmits to user A an offer to sell 20 units at $10.90. User A does not execute it.

The following are additional non-limiting exemplary embodiments. It should be appreciated that while many embodiments are described as an apparatus, another exemplary corresponding embodiment may be a method of performing the actions described in the apparatus embodiments, as well as a non-transitory computer-readable medium having instructions stored thereon that are configured to, when executed, cause a processor to perform such method.

A. An apparatus comprising:
at least one processor; and
at least one memory having instructions stored thereon which are configured to, when executed by the at least one processor, direct the at least one processor to:
receive from a computer of a first trader a first order to buy or sell a trading product having a first price and a first size;
receive from a second trader a second order to buy or sell the trading product that is contra to the first order, the second order defining a second quantity and a price range of possible prices at which the second order can be executed, the price range comprising at least a second price, in which the second quantity of the trading product is reserved in an OMS of the second trader such that the second quantity of the second order is permitted by the OMS to be executed at any price within the price range;
determine whether the first price of the first order is within the price range of the second order, in which the act of determining whether the first price of the first order is within the price range of the second order comprises determining that the first price of the first order is within the price range of the second order; and
responsive to determining that the first price of the first order is within the price range of the second order, cause to be output to the second trader (1) the price of the first order and (2) an execution indicia selectable by the second trader to cause at least a portion of the second order to be executed against at least a portion of the first order,
in which the first price of the first order and the execution indicia are not output or otherwise disclosed to the second trader prior to the act of determining that the first price of the first order is within the price range of the second order.

B. The apparatus of embodiment A, in which the price range comprises a variable price range that is defined relative to at least one reference price that changes over time, such that the price range changes over time as the reference price changes, and wherein the reference comprises at least one of (1) a best bid price, (2) a best offer price, (3) a midpoint between a best bid price and best offer price, and (4) an INAV.

C. The apparatus of embodiment A, in which the act of receiving the second order comprises receiving a spread value, in which the price range comprises a range of prices between the following two values:
(a) one of (1) a midpoint price of the NBBO, (2) a best bid price of the NBBO, and (3) a best offer price of the NBBO; and
(b) one of (1) the value of (a) increased by the spread value if the second order is a bid, and (2) the value of (a) decreased by the spread value if the second order is an offer.

D. The apparatus of embodiment A, in which the second order is a limit order, and in which the act of receiving the second order comprises receiving a specified price that is priced through the NBBO such that the second price is one of: (1) greater than the current best NBBO offer if the second order is a bid, and (2) less than the current best NBBO bid if the second order is an offer,
in which the price range is determined to be the range of prices between and including (1) a midpoint between the NBBO best bid and best offer and (2) the specified price of the second order.

E. The apparatus of embodiment A, in which the second order is received before the first order.

F. The apparatus of embodiment A, in which the act of causing to be output to the second trader (1) the price of the first order and (2) an execution indicia selectable by the second trader to cause at least a portion of the second order to be executed against at least a portion of the first order comprises:
causing to be presented to the second trader an opportunity to select only one of the following three options: (a) cause at least a portion of the second order to be immediately executed against at least a portion of the first order; (b) not execute any portion of the second order against any portion of the first order; and (3) cancel the second order without executing any portion of the second order against any portion of the first order.

G. The apparatus of embodiment A, in which the act of causing to be output to the second trader (1) the price of the first order and (2) an execution indicia selectable by the second trader to cause at least a portion of the second order to be executed against at least a portion of the first order comprises:

causing to be presented to the second trader an opportunity to select only one of the following two options: (a) cause at least a portion of the second order to be immediately executed against at least a portion of the first order; and (2) cancel the second order without executing any portion of the second order against any portion of the first order.

H. The apparatus of embodiment A, in which the second order comprises a best price order, in which the best price order comprises one of (1) a bid having a highest bid price in an electronic trading system and (2) a best offer having a lowest offer price in an electronic trading system.

I. The apparatus of embodiment A, in which the act of determining whether the first price of the first order is within the price range of the second order is performed by a first module of a first computer system of the second user that is separated by a firewall from a second module of the first computer system that interfaces with the second user such that information received by the first module is protected from disclosure to the second user, and wherein the first module communicates with corresponding modules of other computer systems of other traders that are similarly screened off from the respective other traders by a respective other firewall.

J. The apparatus of embodiment A, in which the instructions, when executed, further direct the at least one processor to:

receive from the second trader a selection of the execution indicia; and responsive to receiving the selection of the execution indicia, cause the second order and the first order to be at least partially matched and executed at the price of the first order.

K. The apparatus of embodiment A, in which the act of receiving the second order occurs before the act of receiving the first order.

L. The apparatus of embodiment A, in which the second order comprises an order that is immediately executable by a counterparty at least one price within the price range without further input from the second trader.

M. The apparatus of embodiment A, in which the second order is not disclosed to the first trader at any time prior to execution of the second order, and in which the first trader and second trader each submit a plurality of orders that are capable of being disclosed to other traders who are qualified to receiving such disclosure about a specific order but that are not disclosed to other traders who are not so qualified.

N. The apparatus of embodiment A, in which the price range comprises a price range bounded by a lower value and an upper value, and wherein one of the upper value and lower value comprises a current midpoint of a current NBBO for the trading product.

O. The apparatus of embodiment N, in which the price range comprises a price range bounded by (1) a current midpoint of a current NBBO for the trading product and (2) another value between a best bid of the NBBO and a best offer of the NBBO.

P. The apparatus of embodiment N, in which the price range comprises a price range bounded by (1) a current midpoint of a current NBBO for the trading product and (2) a value selected by the second trader.

Q. The apparatus of embodiment N, in which the instructions, when executed, further direct the at least one processor to:

determine that the NBBO midpoint has changed to a different midpoint;

cause the price range of the second order to be updated such that the order defines an updated price range bounded by different price boundaries determined based on the different midpoint.

R. A method comprising:

receive, by at least one processor, from a second trader a second order to buy or sell a trading product, the order defining a price range of possible execution and a second quantity, in which the second quantity of the trading product is reserved in an OMS of the second trader such that the quantity of the second order can be executed at a price within the price range;

receiving, by the at least one processor, from a first trader a first order comprising a first order contra to the order, the first order comprising a price within the price range of possible execution;

determining, by the at least one processor, that the first order comprises a price within the price range of execution of the second order;

responsive to determining that the first order comprises a price within the price range of possible execution, causing, by the at least one processor, to be output to the second trader (1) the price of the first order and (2) an execution indicia selectable by the second trader to cause at least a portion of the second order to be executed against at least a portion of the first order;

receiving, by the at least one processor, from the second trader a selection of the execution indicia;

responsive to receiving the selection of the execution indicia, causing, by the at least one processor, the second order and the first order to be at least partially matched and executed at the price of the first order.

S. A method comprising:

receiving, by at least one processor of a computer, from a computer of a first trader a first order to buy or sell a trading product having a first price and a first size;

receiving, by the at least one processor of a computer, from a second trader a second order to buy or sell the trading product that is contra to the first order, the second order defining a second quantity and a price range of possible prices at which the second order can be executed, the price range comprising at least a second price, in which the second quantity of the trading product is reserved in an OMS of the second trader such that the second quantity of the second order is permitted by the OMS to be executed at any price within the price range, in which the second order is received before or after the first order is received;

determining, by the at least one processor of a computer, whether the first price of the first order is within the price range of the second order, in which the act of determining whether the first price of the first order is within the price range of the second order comprises determining that the first price of the first order is within the price range of the second order; and responsive to determining that the first price of the first order is within the price range of the second order, causing, by the at least one processor of a computer, to be output to the second trader (1) the price of the first order and (2) an execution indicia selectable by the second trader to cause at least a portion of the second order to be executed against at least a portion of the first order, in which the first price of the first order and the execution indicia are not output or otherwise disclosed to the second trader prior to the act of determining that the first price of the first order is within the price range of the second order.

T. A non-transitory machine-readable medium having instructions stored thereon which, when executed by the at least one processor, direct the at least one processor to:

receive from a computer of a first trader a first order to buy or sell a trading product having a first price and a first size;

receive from a second trader a second order to buy or sell the trading product that is contra to the first order, the second order defining a second quantity and a price range of possible prices at which the second order can be executed, the price range comprising at least a second price, in which the second quantity of the trading product is reserved in an OMS of the second trader such that the second quantity of the second order is permitted by the OMS to be executed at any price within the price range, in which the second order is received before or after the first order is received;

determine whether the first price of the first order is within the price range of the second order, in which the act of determining whether the first price of the first order is within the price range of the second order comprises determining that the first price of the first order is within the price range of the second order; and responsive to determining that the first price of the first order is within the price range of the second order, cause to be output to the second trader (1) the price of the first order and (2) an execution indicia selectable by the second trader to cause at least a portion of the second order to be executed against at least a portion of the first order, in which the first price of the first order and the execution indicia are not output or otherwise disclosed to the second trader prior to the act of determining that the first price of the first order is within the price range of the second order.

XII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the disclosed methods and method steps without departing from the scope of the invention. The methods may include more, fewer, or other steps. Additionally, steps may be performed in any suitable order without departing from the scope of the invention.

While this disclosure has been described in terms of certain embodiments and generally associated methods, alterations and permutations of the various systems, methods, software, and other embodiments will be apparent to those skilled in the art. Accordingly, the above description of example embodiments does not constrain this disclosure. Other changes, substitutions, and alterations are also possible without departing from the spirit and scope of this disclosure, e.g., as defined by the claims herein.

In particular, it should be appreciated that while this disclosure has generally been described in reference to discretion orders and immediate or cancel orders, the features and embodiments described herein may also apply to other order types.

XIII. References

It should be appreciated that various embodiments of the present invention may use one or more features, technologies, matching systems, execution systems, darkpool matching systems, clearing systems, user configuration systems, brokering systems, and other features of any of the features disclosed in the following documents: U.S. Pat. No. 8,285,629 to Lutnick et al., U.S. Ser. No. 12/113,642, filed May 1, 2008 (now U.S. Pat. No. 8,311,920), U.S. Ser. No. 12/113,602, filed May 1, 2008 (now U.S. Pat. No. 8,082,205), U.S. Pat. No. 7,136,834 to Merrin, U.S. Ser. No. 13/888,352, filed May 6, 2013; the disclosures of which are hereby incorporated by reference herein in their entireties.

It should be appreciated that various embodiments may be configured to operate in a trading system characterized by claim 1 of U.S. Pat. No. 8,285,629 to Lutnick, copied below:

1. A method comprising: receiving, by a marketplace, a firm order for a financial instrument from a broker participant of the marketplace, in which the firm order defines a side of a trade for the financial instrument, and in which the firm order includes an order to execute the trade without additional authorization from the broker participant; in response to receiving the firm order by the marketplace, posting the firm order to the order book of the marketplace; in response to receiving the firm order by the marketplace, transmitting an order query identifying the firm order from the marketplace to all proprietary-investment participants of the marketplace, in which each of the plurality of proprietary-investment participants includes a respective order management system, in which each respective order management system is configured to store securely store information about a plurality of order interests without revealing the interests outside of the respective proprietary-investment participant, in which each of the plurality of proprietary-investment participants includes a module configured to securely interface with a respective order management system of the respective proprietary-investment participant, in which each of the proprietary-investment participants include participants that engage in trading for their own respective proprietary money management purposes; in response to receiving a respective order query by a respective proprietary-investment participant, determining, by a respective module configured to securely interface with a respective order management system of a respective proprietary-investment participant of the plurality of proprietary-investment participants, that a matching order is stored in the respective order management system associated with the respective proprietary-investment participant without revealing information about respective trading interests of the respective proprietary-investment participant outside of the respective proprietary-investment participant; in response to the determination, providing, by the respective module of the respective proprietary-investment participant, a request for acceptance of the firm order without revealing information about respective trading interests of the respective proprietary-investment participant outside of the respective proprietary-investment participant; receiving, by the respective module of the respective proprietary-investment participant, a positive reply to the request for acceptance; in response to receiving the positive reply, transmitting, from the respective module of the respective proprietary-investment participant to the marketplace, an indication that a trade fulfilling at least a part of the firm order and at least a part of the matching order should be executed; receiving, by the marketplace, the indication that the trade should be executed; in response to receiving the indication that the trade should be executed by the marketplace, facilitating execution of a the trade fulfilling at least part of the firm order and at least part of the matching order without a further communication with the broker participant; and in response to receiving the indication that the trade should be executed by the marketplace, preventing a communication about the positive reply until after the execution, in which preventing the communication includes maintaining confidentiality of any trading interests of the respective proprietary-investment participant.

The invention claimed is:

1. An apparatus comprising:
at least one processor configured to control:
receiving, over a communication network, from a first computer associated with a first trader a first order to buy or sell a trading product having a first price and a first size;
receiving, over the communication network, from a second computer associated with a second trader a second order to buy or sell the trading product that is contra to the first order, the second order defining a second quantity and a price range of possible prices at which the second order is executable, the price range comprising at least a second price, in which the second quantity of the trading product is reserved in an Order Management System (OMS) of the second trader such that the second quantity of the second order is permitted by the OMS to be executed at any price within the price range, the OMS of the second trader comprising at least one electronic database, in which the price range comprises a variable price range that is defined relative to at least one reference price that is changeable over time, such that the price range changes over time as the at least one reference price changes,
in which first information associated with the first order received over the communication network is protected from disclosure to the second trader;
receiving continuously in real time, over the communication network, updated real time market information from a remote third computer; and
in real time,
determining the price range using the at least one reference price indicated by the updated real time market information;
determining whether the first price of the first order is within the price range of the second order; and
responsive to a determination that the first price of the first order is within the price range of the second order, causing, over the communication network, a display of another computing device associated with the second trader to display first indicia for accepting a trade at the first price and second indicia for rejecting the trade at the first price, and in response to selection of the first indicia, automatically (1) matching and executing at least a portion of the second order against at least a portion of the first order at the first price of the first order and (2) displaying to the second trader, at a graphical user interface of a display device electronically coupled to the second computer, the first price of the first order,
in which the first price of the first order is not output or otherwise disclosed to the second trader prior to the determination that the first price of the first order is within the price range of the second order.

2. The apparatus of claim 1, wherein the at least one reference price comprises at least one of (1) a best bid price, (2) a best offer price, (3) a midpoint between a best bid price and best offer price, or (4) an indicative net asset value (INAV).

3. The apparatus of claim 1, in which receiving the second order comprises receiving a spread value, in which the price range comprises a range of prices between the following two values:
(a) one of (1) a midpoint price of a National Best Bid and Offer (NBBO), (2) a best bid price of the NBBO, and (3) a best offer price of the NBBO; and
(b) one of (1) the value of (a) increased by the spread value if the second order is a bid, and (2) the value of (a) decreased by the spread value if the second order is an offer.

4. The apparatus of claim 1, in which the second order is a limit order, and in which receiving the second order comprises receiving a specified price that is priced through a National Best Bid and Offer (NBBO) such that the second price is one of: (1) greater than a current best NBBO offer if the second order is a bid, and (2) less than a current best NBBO bid if the second order is an offer,
in which the price range is determined to be prices between and including (1) a midpoint between the current NBBO best bid and best offer and (2) the specified price of the second order.

5. The apparatus of claim 1, in which the second order is received before the first order.

6. The apparatus of claim 1, in which the at least one processor is configured to control:
receiving, over the communication network, from a third computing device associated with a third trader a third order to buy or sell the trading product that is contra to the first order, the third order defining a third quantity and a third price range of possible prices at which the third order is executable, the third price range comprising at least a third price, in which the third quantity of the trading product is reserved in a third OMS of a third trader such that the third quantity of the third order is permitted by the third OMS to be executed at any price within the third price range, the third OMS of the third trader comprising the at least one electronic database;
determining whether the first price of the first order is within the third price range of the third order; and
responsive to a determination that the first price of the first order is within the third price range of the third order, displaying to the third trader at the graphical user interface of a display device electronically coupled to the third computing device (1) the first price of the first order, and (2) an execution indicia selectable by the third trader to cause at least a portion of the third order to be executed against at least a portion of the first order,
in which displaying to the third trader (1) the first price of the first order and (2) the execution indicia selectable by the third trader to cause at least the portion of the third order to be executed against at least the portion of the first order comprises:
displaying to the third trader an opportunity to select only one of the following three options: (a) cause at least the portion of the third order to be immediately executed against at least the portion of the first order; (b) not execute any portion of the third order against any portion of the first order; and (3) cancel the third order without executing any portion of the third order against any portion of the first order.

7. The apparatus of claim 1, in which the at least one processor is configured to control:

receiving, over the communication network, from a third computing device associated with a third trader a third order to buy or sell the trading product that is contra to the first order, the third order defining a third quantity and a third price range of possible prices at which the third order is executable, the third price range comprising at least a third price, in which the third quantity of the trading product is reserved in a third OMS of the third trader such that the third quantity of the third order is permitted by the third OMS to be executed at any price within the third price range, the third OMS of the third trader comprising at least one electronic database;

determining whether the first price of the first order is within the third price range of the third order; and responsive to a determination that the first price of the first order is within the third price range of the third order, displaying to the third trader at a graphical user interface of a display device electronically coupled to a third computing device (1) the first price of the first order, and (2) an execution indicia selectable by the third trader to cause at least a portion of the third order to be executed against at least a portion of the first order, in which the displaying to the third trader (1) the price of the first order and (2) the execution indicia selectable by the third trader to cause at least the portion of the third order to be executed against at least a portion of the first order comprises:

displaying to the third trader an opportunity to select only one of the following two options: (a) cause at least the portion of the third order to be immediately executed against at least a portion of the first order; and (2) cancel the third order without executing any portion of the third order against any portion of the first order.

8. The apparatus of claim 1, in which the second order comprises a best price order, in which the best price order comprises one of (1) a bid having a highest bid price in an electronic trading system and (2) a best offer having a lowest offer price in the electronic trading system.

9. The apparatus of claim 1, in which the receiving the second order occurs before the receiving the first order.

10. The apparatus of claim 1, in which the second order is not disclosed to the first trader at any time prior to execution of the second order, and in which the first trader and the second trader each submit a plurality of orders that are capable of being disclosed to other traders who are qualified to receive such disclosure about a specific order but that are not disclosed to the other traders who are not so qualified.

11. The apparatus of claim 1, in which the price range comprises a price range bounded by a lower value and an upper value, and wherein one of the upper value and the lower value comprises a current midpoint of a current National Best Bid and Offer (NBBO) for the trading product.

12. The apparatus of claim 11, in which the price range comprises a price range bounded by (1) the current midpoint of a current NBBO for the trading product and (2) another value between a best bid of the NBBO and a best offer of the NBBO.

13. The apparatus of claim 11, in which the price range comprises a price range bounded by (1) the current midpoint of a current NBBO for the trading product and (2) a value selected by the second trader.

14. The apparatus of claim 11, in which the at least one processor is configured to control:

determining that the current midpoint of the current NBBO has changed to a different midpoint; and updating the price range of the second order such that the second order defines an updated price range bounded by different price boundaries determined based on the different midpoint.

15. The apparatus of claim 1, in which the at least one processor is configured to control:

receiving from the second trader a request not to execute against any portion of the first order; and in response to receiving the request not to execute, preventing disclosure to the second trader of a third order contra to the second order that has a price within the price range.

16. The apparatus of claim 1, wherein the first price of the first order is displayed at a graphical user interface of a display device electronically coupled to a third computing device associated with a third trader satisfying a predetermined condition, before determination that the first price of the first order is within the price range of the second order.

17. A method comprising:

controlling, by at least one processor:

receiving, over a communication network, from a first computing device associated with a first trader a first order to buy or sell a trading product having a first price and a first size;

receiving, over the communication network, from a second computing device associated with a second trader a second order to buy or sell the trading product that is contra to the first order, the second order defining a second quantity and a price range of possible prices at which the second order is executable, the price range comprising at least a second price, in which the second quantity of the trading product is reserved in an Order Management System (OMS) of the second trader such that the second quantity of the second order is permitted by the OMS to be executed at any price within the price range, in which the second order is received before or after the first order is received, the OMS of the second trader comprising at least one electronic database, in which the price range comprises a variable price range that is defined relative to at least one reference price that is changeable over time, such that the price range changes over time as the at least one reference price changes;

in which first information associated with the first order received over the communication network is protected from disclosure to the second trader;

receiving continuously in real time, over the communication network, updated real time market information from a remote third computing device; and in real time, determining the price range using the at least one reference price indicated by the updated real time market information;

determining whether the first price of the first order is within the price range of the second order; and responsive to a determination that the first price of the first order is within the price range of the second order, causing, over the communication network, a display of another computing device associated with the second trader to display first indicia for accepting a trade at the first price and second indicia for rejecting the trade at the first price, and in response to selection of the first indicia, automatically (1) matching and executing at least a portion of the second order against at least a portion of the first order at the first price of the first order and (2) displaying to the second trader, at a graphical user interface of a display device electronically coupled to the second computing device, the first price of the first order, in which the first price of the first order is not output or otherwise disclosed to the second trader prior to the determination that the first price of the first order is within the price range of the second order.

18. The method of claim 17, wherein the at least one reference price comprises at least one of (1) a best bid price, (2) a best offer price, (3) a midpoint between a best bid price and best offer price, and (4) an indicative net asset value (INAV).

19. The method of claim 17, in which receiving the second order comprises receiving a spread value, in which the price range comprises a range of prices between the following two values:
 (a) one of (1) a midpoint price of a National Best Bid and Offer (NBBO), (2) a best bid price of the NBBO, and (3) a best offer price of the NBBO; and
 (b) one of (1) the value of (a) increased by the spread value if the second order is a bid, and (2) the value of (a) decreased by the spread value if the second order is an offer.

20. A non-transitory machine-readable medium configured to store instructions which, when executed by at least one processor control:
 receiving, over a communication network, from a first computing device of a first trader a first order to buy or sell a trading product having a first price and a first size;
 receiving, over the communication network, from a second computing device of a second trader a second order to buy or sell the trading product that is contra to the first order, the second order defining a second quantity and a price range of possible prices at which the second order is executable, the price range comprising at least a second price, in which the second quantity of the trading product is reserved in an Order Management System (OMS) of the second trader such that the second quantity of the second order is permitted by the OMS to be executed at any price within the price range, in which the second order is received before or after the first order is received, the OMS of the second trader comprising at least one electronic database, in which the price range comprises a variable price range that is defined relative to at least one reference price that changes over time, such that the price range is changeable over time as the at least one reference price changes;
 receiving continuously in real time, over the communication network, updated real time market information from a remote third computing device; and
 in real time,
 determining the price range using the at least one reference price indicated by the updated real time market information;
 determining whether the first price of the first order is within the price range of the second order;
 responsive to a determination that the first price of the first order is within the price range of the second order, causing, over the communication network, a display of another computing device associated with the second trader to display first indicia for accepting a trade at the first price and second indicia, and in response to selection of the first indicia, automatically (1) matching and executing at least a portion of the second order against at least a portion of the first order at the first price of the first order and (2) displaying to the second trader, at a graphical user interface of a display device electronically coupled to the second computing device, the first price of the first order,
 in which the first price of the first order is not output or otherwise disclosed to the second trader prior to the determination that the first price of the first order is within the price range of the second order.

* * * * *